United States Patent [19]
De Groef

[11] 3,990,661
[45] Nov. 9, 1976

[54] FEED THROUGH CONNECTIONS

[75] Inventor: Pierre De Groef, Brussels, Belgium

[73] Assignee: Raychem Corporation, Menlo Park, Calif.

[22] Filed: Aug. 21, 1973

[21] Appl. No.: 390,231

[30] Foreign Application Priority Data
Aug. 21, 1972 United Kingdom............... 38813/72

[52] U.S. Cl............................... 248/56; 285/381; 16/2; 403/197; 174/DIG. 8; 339/DIG. 1; 16/108
[51] Int. Cl.² ..................... F16L 5/00; F16L 25/00; F16L 57/00
[58] Field of Search................. 248/56; 339/DIG. 1; 174/DIG. 8; 403/197; 285/381, DIG. 10; 16/2; 29/447

[56] References Cited
UNITED STATES PATENTS

| 2,994,933 | 4/1956 | Wolfe .................................. 24/141 |
| 3,423,518 | 1/1969 | Weagant........................... 285/381 |
| 3,518,359 | 6/1970 | Trimble .............................. 248/56 |
| 3,548,079 | 12/1970 | Jones................................. 285/381 |
| 3,793,672 | 2/1974 | Wetmore ................................ 16/2 |
| 3,801,954 | 4/1974 | Dorrell......................... 339/DIG. 1 |
| 3,805,567 | 4/1974 | Sinerco.............................. 285/381 |

FOREIGN PATENTS OR APPLICATIONS
1,294,510 11/1972 United Kingdom.................. 248/56

Primary Examiner—Bernard A. Gelak
Attorney, Agent, or Firm—Lyon & Lyon

[57] ABSTRACT

A heat recoverable member is disposed about a utility carrier and positioned at least partially within an aperture. The heat recoverable member includes a heat expansible portion disposed within the aperture and a heat shrinkable portion coupled to the heat expansible portion. The heating of the heat recoverable member results in the heat expansible portion expanding in the aperture and the heat shrinkable portion shrinking about the utility carrier.

12 Claims, 5 Drawing Figures

FEED THROUGH CONNECTIONS

BACKGROUND OF THE INVENTION

This invention relates to method and apparatus for feed through connections.

More particularly, this invention relates to feed through devices for supply lines or utility carriers such as a cable, a wire or a pipe, which must be passed through an aperture in a structure such as a wall of a building, the casing of a machine or a locating device in electrical apparatus.

When supply lines, especially flexible supply lines, are fed through an aperture, it is important that the danger of rupture of the supply line caused by the rough edges of the aperture be minimized. It is also generally necessary that the supply lines be firmly held in relation to the aperture to avoid unwanted movement of the supply line both within the aperture itself and on either side of it. FInally, it is important, especially when the supply line passes from an external location to an internal location, that the feed through connection utilized be firmly sealed against the ingress of moisture and other contaminants such as small insects.

In the past, various feed through devices have been proposed for such purposes including flexible grommets, usually made from rubber or a similar material. These grommets were provided with two terminal shoulders which located the grommet firmly within the aperture. The overall outer diameter of the grommet is slightly larger than that ofthe aperture into which it is placed to ensure a tight fit, and the inner diameter of the grommet is slightly less than that of the supply line which is passed through it to ensure that the latter is firmly gripped by frictional and resilient forces. Such grommets have proved suitable for general applications such as with electrical apparatus since they adequately protect the supply line, e.g., a wire or cable, against the sharp edges of the apertures which are stamped or bored in associated metal panels.

However, these grommets generally suffer from the disadvantage that they can only be used over a small range of tolerance regarding the size of the aperture and the size of the supply line. Furthermore, they are generally not satisfactory for larger scale uses especially in outdoor/indoor applications where protection against moisture, etc., is of paramount importance.

The present invention lessens the prior art difficulties by providing a method of feeding a supply line through an aperture and firmly locating the supply line within the aperture. This is accomplished by positioning a hollow heat recoverable member or article around the supply line and at least partially within the aperture, the heat recoverable article being constructed of two or more portions or parts. A first portion or part is heat shrinkable and a second is heat expansible. Heating of the heat recoverable article results in the shrinkage of the heat shrinkable part to firmly grip the supply line. The heating also results in the heat expansible part expanding and firmly locates the heat recovered article, and thereby the supply line, within the aperture.

The present invention also provides a generally tubular heat recoverable article suitable for use in the method of the present invention.

The heat recoverable article may take various forms, depending on the particular application concerned. For example, in some cases it may be sufficient that a heat shrinkable part is provided at only one end of the article (i.e., so that it operates only on one side of the aperture), but in other cases it may be desirable to provide a heat shrinkable part at both ends in order to strengthen and give increased firmness to the feed through connection. In this latter case the heat recoverable article may comprise, for example, a central heat expansible part and two heat shrinkable end parts.

However, in a preferred embodiment of the present invention, the article comprises an outer heat shrinkable tube which surrounds, and overlaps at each end, an inner heat expansible tube. The strength of recovery of the latter being the greater so that, when the article is completely recovered, the central portion of the article expands and locates the article within the aperture and the two overlapping heat shrinkable end portions shrink down and grip the supply line.

The heat expansible and heat shrinkable parts of the articles of the present invention may be held together by the use of adhesives, but, in more cases, it will be preferable to form the articles by partially heat shrinking the heat shrinkable part(s) so that it comes into contact with and firmly grips the heat expansible part(s). An ahdesive may also be used in this latter case, such as a hot melt adhesive.

Adhesives may also be used to improve the strength of the feed through connection. For example, the heat shrinkable part(s) may be provided with an inner lining of an adhesive and/or the heat expansible part(s) may be provided with an outer layer of an adhesive. Alternatively, the adhesive may be applied separately when making the connection. Especially suitable, are hot-melt adhesives such, for example, as polyamide-type materials, ethylene/vinyl acetate copolymers and terpolymers (with or without incorporated paraffin waxes) and polyesters. these can be provided as an inner or outer lining, respectively, on the heat recoverable parts and melt and flow on recovery of the latter to form the desired bond and seal. Also suitable are semi-hot melt adhesives such as polyethylene based materials including peroxide curing agents which will also melt and flow on recovery, but which will not afterwards be hot-meltable in view of the action of the curing system. Amongst suitable adhesives which can be applied to the portions during the making of the feed through connection there may be mentioned, for example, eppoxy resins and conventional mastics such as, for example, those based on butyl and natural rubbers with incorporated pitch and similar materials. Obviously the type of adhesive employed and the method of its application will depend on the particular requirements in any given case.

Any heat recoverable material may, in principle, be used in the present invention although the most suitable material will usually depend on the environment in which the connection is being made. Suitable materials are disclosed, for example, in U.S. Pat. No. 3,297,819, assigned to the assignee of the present invention, the disclosure of which is incorporated herein by reference. Examples of such suitable materials are cross-linked polyolefines, especially polyethylene, cross-linked polyvinylidene fluoride, such as that sold under the trademark Kynar, cross-linked polyvinyl chloride, normal (unmodified) polyvinyl chloride, cross-linked or uncross-linked chlorinated polyethylenes, neoprene, ethylene propylene rubbers and silicon rubbers. Cross-linked Kynar is especially preferred for use in the present invention.

The method and article of the present invention facilitate a rapid and strong feed through connection while considerably reducing the strain at the aperture. The supply line is "loosely" located in the aperture because of the relative flexibility of the heat recoverable article itself, especially the heat expansible portion thereof, and any bending, twisting or other strains at the entrance to or exit from the aperture are largely accommodated by the heat recoverable article.

The dimensions of the heat recoverable article and degree of shrinkage and expansion will be chosen such that the fully shrunk dimension of the shrinkable portion(s) is less than the corresponding outer dimension of the supply line and such that the fully expanded dimension of the expansible portion is greater than the corresponding dimension of the aperture. However, subject to these provisions it will be obvious to one skilled in the art that because of the large potential degree of expansion and shrinkage, respectively, available in the heat recoverable article, the latter can be used over a wide range of dimensional tolerances both with regard to the size of the aperture and the size of the supply line. This is another outstanding advantage of the present invention.

SUMMARY OF THE INVENTION

It is therefore an object of this invention to provide method and apparatus for forming feed through connections.

It is another object of this invention to provide heat recoverable articles for forming feed through connections which can be used over a wide range of tolerances.

It is a further object of this invention to provide heat recoverable feed through connections which will protect supply lines.

BRIEF DESCRIPTION OF THE DRAWINGS

The invention both as to its organization and principles of operation together with further objects and advantages thereof may better be understood by referring to the following detailed description of embodiments of the invention when taken in conjunction with the accompanying drawings in which.

DESCRIPTION OF A PREFERRED EMBODIMENT

Figure 1:
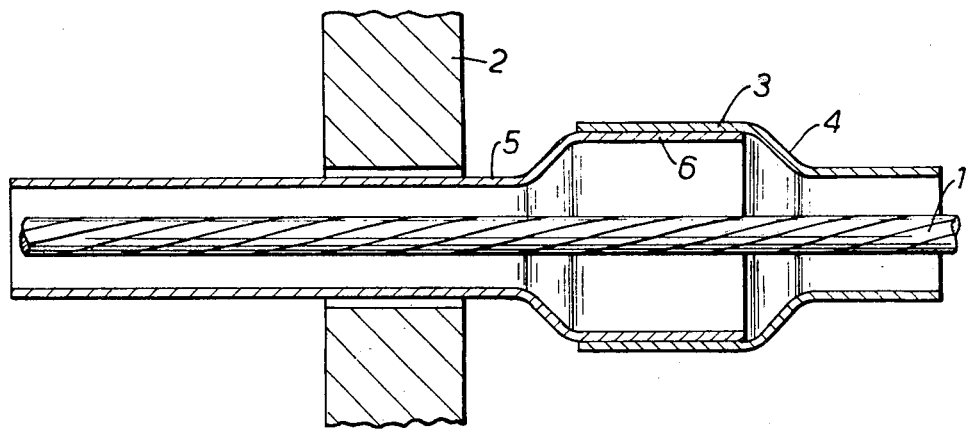
FIG. 1 illustrates a heat recoverable article positioned around a wire being passed through an aperture in accordance with this invention.
Figure 5:
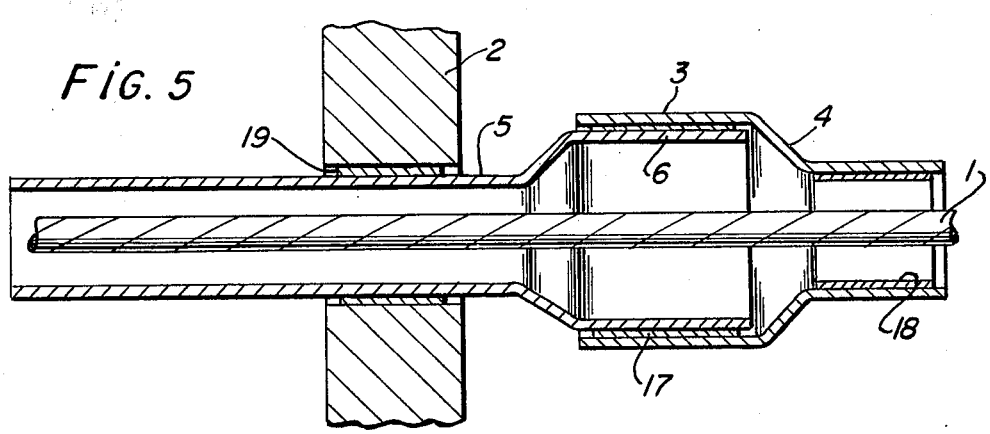
FIG. 5 illustrates the article of FIG. 1 with the addition of adhesive.

Referring to FIG. 1, a supply line or wire 1 passes through an aperture in a machine casing 2. A heat recoverable member or article 3 comprises a heat shrinkable portion or part 4 and a heat expansible portion or part 5. In order to assist location of the parts of the heat recoverable article prior to recovery the heat shrinkable part 4 has been partially recovered at 6 so that it firmly grips the expansible part 5 at this location (it would, of course, equally be possible to partially expand the part 5 at this location for the same purpose, or even to utilize both partial expansion and partial shrinkage). An adhesive 17 as seen in FIG. 5 may or may not be supplied between the parts at this point. In general, it has been found that in using a material such as Kynar, there is a natural affinity between the parts which results in a firm grip without the use of adhesive 17.

Figure 2:
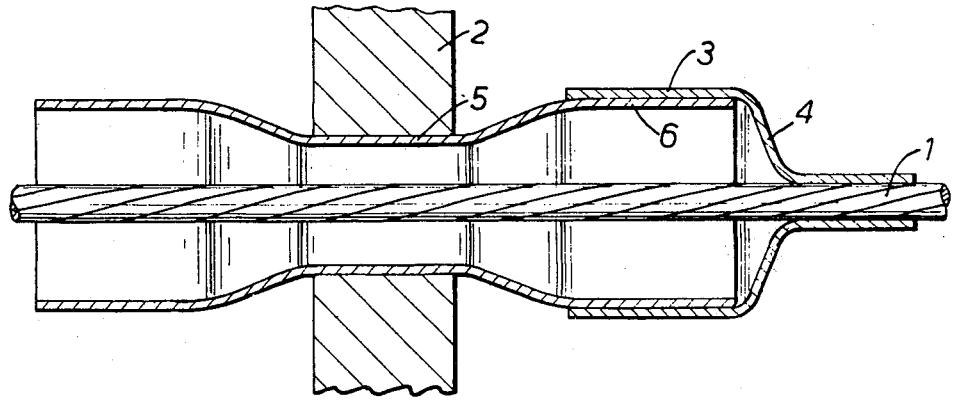
FIG. 2 illustrates the feed through connection made on recovery of the heat recoverable article of FIG. 1 in accordance with this invention.

In FIG. 2, the position is shown after the member 3 has been heated to its recovery temperature. The shrinkable part 4 has shrunk about and firmly grips the wire 1 and the expansible part 5 has expanded to contact the casing 2 and locate the feed through connection firmly within the aperture.

Figure 3:
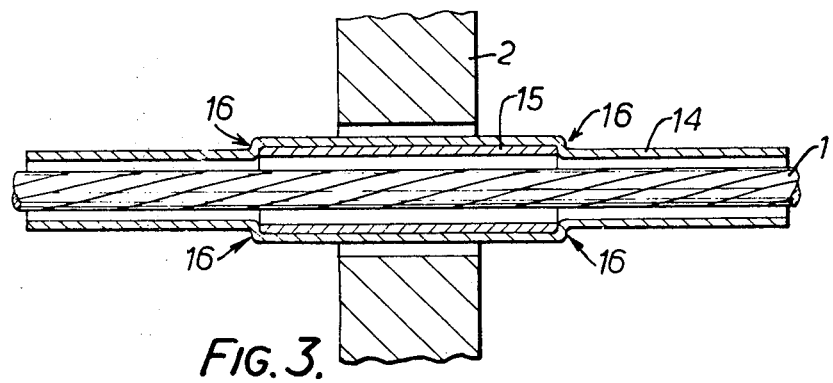
FIG. 3 illustrates another embodiment of a heat recoverable article in an environment similar to that of FIG. 1 and in accordance with this invention.
Figure 4:
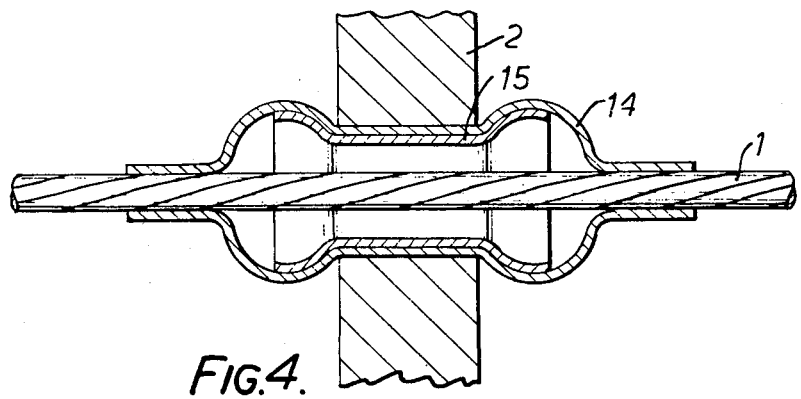
FIG. 4 illustrates the article of FIG. 3 after recovery in accordance with this invention.

Referring now to FIGS. 3 and 4, the heat recoverable article comprises an outer heat shrinkable tubular member or sleeve 14 which surrounds and overlaps at each end and an inner tubular heat expansible member or part 15. The part 14 has been partially recovered about the part 15 and, by this recovery, the part 15 is securely held and positioned within the sleeve 14 both by the mutual adherence of the Kynar and by the formation of the shoulders 16 resulting from partial recovery. The heat expansible part 15 has stronger recovery characteristics so that on recovery, as shown in FIG. 4, it forces the central portion of the heat recoverable sleeve outwardly against the aperture while the end portions of the heat shrinkable sleeve 14 recover and firmly grip the wire 1.

Adhesives may also be used to improve the strength of the feed through connection. For example, the heat shrinkable part 4 may be provided with an inner lining of an adhesive 18 and/or the heat expansible part 5 may be provided with an outer layer of an adhesive 19, as shown in FIG. 5.

It is believed to be apparent that the method of the present invention is not limited to any particular sequence of operation. In some cases, for example, it may be advantageous to shrink the heat shrinkable portion around the supply line before positioning the latter within the aperture for expansion of the heat expansible portion.

While embodiments and applications of this invention have been shown and described, it will be apparent to those skilled in the art that many more modifications are possible without departing from the inventive concepts herein described. The invention therefore is not to be restricted except as is necessary by the prior art and by the spirit of the appended claims.

What is claimed as new and desired to be secured by Letters Patent of the United States is:

1. A feed through connection for a supply line within an aperture comprising a hollow heat recoverable article disposed about the supply line and at least partially positioned within the aperture, said heat recoverable article including a heat expansible member and a first heat shrinkable member, said heat expansible member, upon expansion, firmly locating the article within the aperture and said first heat shrinkable member, upon shrinkage, firmly gripping the supply line, said first heat shrinkable member being positioned about only one end of said heat expansible member.

2. The connection as in claim 1 wherein said first heat shrinkable member is partially recovered about the one end of the article.

3. A feed through device to be positioned about at least a first supply line in an aperture through which the supply line is to pass, comprising:

a hollow article having at least first and second open ends through which a supply line may pass, said article including a hollow heat expansible member and a hollow heat shrinkable member mutually positioned to form said hollow article, at least a portion of said heat shrinkable member being disposed about at least a portion of said heat expansible member and in close proximity thereto, at least another portion of one of said members extending beyond an end portion of another of said members, said heat expansible member being expansible against the surrounding aperture and said heat shrinkable member being contractive about the enclosed supply line.

4. The device as set forth in claim 3 wherein said first heat shrinkable member is partially recovered about said heat expansible member.

5. The device of claim 3 wherein said heat shrinkable member extends over all of said heat expansible member and beyond said heat expansible member to form said first and second open ends, the recovery force of said heat expansible member being greater than that of said heat shrinkable member.

6. The device as set forth in claim 3 wherein said hollow article is formed of cross-linked polyvinylidene flouride.

7. The device as set forth in claim 3 wherein said hollow article is formed of a cross-linked polyolefin.

8. The device of claim 3 further including a layer of adhesive disposed between said heat expansible member and said heat shrinkable member.

9. The device of claim 3 further including a layer of adhesive disposed about said hollow article.

10. The device of claim 3 further including a layer of adhesive disposed within said heat shrinkable member.

11. A feed through device to be psoitioned about at least a first supply line in an aperture through which the supply line is to pass, comprising:

a tubular article having at least first and second open ends through which a supply line may pass, said article including a tubular heat expansible member and a tubular heat shrinkable member, at least a portion of said tubular heat shrinkable member extending over at least a portion of said tubular heat expansible member to form said tubular article and in close proximity thereto, at least another portion of one of said members extending beyond an end portion of another of said members said tubular article being expansive along a first portion of its length under the influence of said heat expansible member and being contractive along a second portion of its length under the influence of said heat shrinkable member.

12. The device of claim 11 wherein said heat shrinkable member is positioned about said heat expansible member and extends beyond said expansible member to said first and said second open ends, the recovery force of said heat expansible member being greater than that of said heat shrinkable member.

* * * * *